US012587978B2

(12) United States Patent
Yuan et al.

(10) Patent No.: US 12,587,978 B2
(45) Date of Patent: Mar. 24, 2026

(54) DIFFERENTIAL POWER PARAMETER REPORTING IN MULTI-PANEL UPLINK TRANSMISSION

(71) Applicant: QUALCOMM Incorporated, San Diego, CA (US)

(72) Inventors: Fang Yuan, Beijing (CN); Mahmoud Taherzadeh Boroujeni, San Diego, CA (US); Jelena Damnjanovic, Del Mar, CA (US); Wooseok Nam, San Diego, CA (US); Yan Zhou, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 18/001,201

(22) PCT Filed: Jul. 30, 2020

(86) PCT No.: PCT/CN2020/105789
§ 371 (c)(1),
(2) Date: Dec. 8, 2022

(87) PCT Pub. No.: WO2022/021208
PCT Pub. Date: Feb. 3, 2022

(65) Prior Publication Data
US 2023/0232345 A1 Jul. 20, 2023

(51) Int. Cl.
*H04W 52/36* (2009.01)
*H04W 52/42* (2009.01)

(52) U.S. Cl.
CPC ......... *H04W 52/42* (2013.01); *H04W 52/365* (2013.01)

(58) Field of Classification Search
CPC ............... H04W 52/42; H04W 52/365; H04W 40/08; H04W 52/325; H04W 52/221
See application file for complete search history.

(56) References Cited

U.S. PATENT DOCUMENTS 11,160,030 B2 10/2021 Abedini et al.
2015/0327186 A1* 11/2015 Oketani ................. H04L 5/001
370/329

(Continued)

FOREIGN PATENT DOCUMENTS

CN 104956748 A 9/2015
CN 108134659 A 6/2018

(Continued)

OTHER PUBLICATIONS

International Search Report and Written Opinion—PCT/CN2020/105789—ISA/EPO—Apr. 19, 2021.

(Continued)

*Primary Examiner* — Tuan H Nguyen
(74) *Attorney, Agent, or Firm* — QUALCOMM Incorporated

(57) ABSTRACT

Certain aspects of the present disclosure provide techniques for differential power parameter reporting in multi-panel uplink transmission. A method that may be performed by a user equipment (UE) includes determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter generating a reporting message indicating the first transmit power control parameter and the differential transmit power control param- (Continued)

eter; and transmitting the reporting message to a base station.

36 Claims, 9 Drawing Sheets

(56)　　　　　References Cited

U.S. PATENT DOCUMENTS

| | | | |
|---|---|---|---|
| 2019/0081675 A1 | 3/2019 | Jung et al. | |
| 2019/0313348 A1 | 10/2019 | Molavianjazi et al. | |
| 2020/0186304 A1* | 6/2020 | Khoshnevisan | H04W 72/29 |
| 2020/0305148 A1* | 9/2020 | Niu | H04W 72/21 |

FOREIGN PATENT DOCUMENTS

| | | |
|---|---|---|
| CN | 109803363 A | 5/2019 |
| CN | 111052627 A | 4/2020 |
| WO | 2019090063 | 5/2019 |
| WO | 2019183878 A1 | 10/2019 |
| WO | 2019193581 A2 | 10/2019 |
| WO | 2020063560 A1 | 4/2020 |

OTHER PUBLICATIONS

Supplementary European Search Report—EP20947223—Search Authority—The Hague—Apr. 15, 2024.

* cited by examiner

500

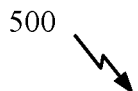

Receive a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter

505

Calculate the second transmit power control parameter based on the first transmit power control parameter and the differential transmit power control parameter

510

Perform power control operations based on the first transmit power control parameter and the second transmit power control parameter.

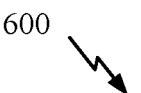

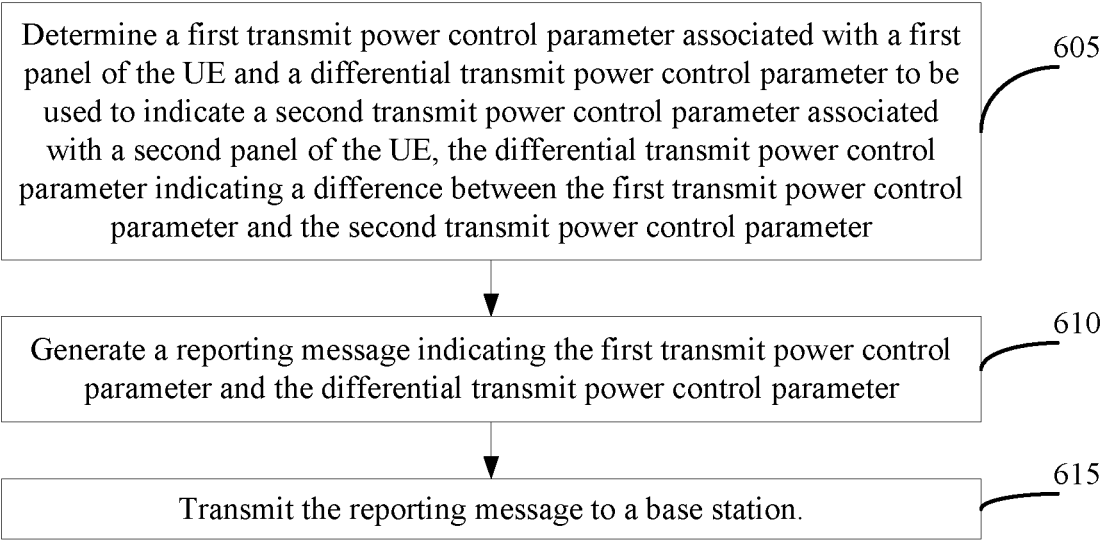

Determine a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter

605

Generate a reporting message indicating the first transmit power control parameter and the differential transmit power control parameter

610

Transmit the reporting message to a base station.

DIFFERENTIAL POWER PARAMETER REPORTING IN MULTI-PANEL UPLINK TRANSMISSION

CROSS-REFERENCE TO RELATED APPLICATION(S)

This application is a national stage application under 35 U.S.C. 371 of PCT/CN2020/105789, filed Jul. 30, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for power control.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved power control operations.

Certain aspects are directed to a method that may be performed by a user equipment (UE). The method generally includes determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter generating a reporting message indicating the first transmit power control parameter and the differential transmit power control parameter; and transmitting the reporting message to a base station.

Certain aspects are directed to a method that may be performed by a base station. The method generally includes receiving a reporting message comprising a first transmit power control parameter and a differential transmit power control parameter, wherein the first transmit power control parameter is associated with a first panel of the UE and the differential transmit power control parameter indicates a second transmit power control parameter associated with a second panel of the UE, the differential transmit power control parameter indicating a difference between the first transmit power control parameter and the second transmit power control parameter; calculating the second transmit power control parameter based on the first transmit power control parameter and the differential transmit power control parameter; and performing power control operations based on the first transmit power control parameter and the second transmit power control parameter.

Certain aspects are directed to an apparatus for wireless communication by a user-equipment (UE). The apparatus generally includes a processing system configured to: determine a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter; and generate a reporting message indicating the first transmit power control parameter and the differential transmit power control parameter; and a transmitter configured to transmit the reporting message to a base station.

Certain aspects are directed to an apparatus for wireless communication by a base station. The apparatus generally includes a receiver configured to receive a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter; and a processing system configured to: calculate the second transmit power control parameter based on the first transmit power control parameter and the differential transmit power control parameter; and perform power control operations based on the first transmit power control parameter and the second transmit power control parameter.

Certain aspects are directed to an apparatus for wireless communication by a user-equipment (UE). The apparatus generally includes means for determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter; means for generating a reporting message indicating the first transmit power control parameter and the differential transmit power control parameter; and means for transmitting the reporting message to a base station.

Certain aspects are directed to an apparatus for wireless communication by a base station. The apparatus generally includes means for receiving a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter; means for calculating the second transmit power control parameter based on the first transmit power control parameter and the differential transmit power control parameter; and means for performing power control operations based on the first transmit power control parameter and the second transmit power control parameter.

Certain aspects are directed to a computer-readable medium having instructions stored thereon to cause a user-equipment (UE) to: determine a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter; generate a reporting message indicating the first transmit power control parameter and the differential transmit power control parameter; and transmit the reporting message to a base station.

Certain aspects are directed to a computer-readable medium having instructions stored thereon to cause a base station to: receive a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter; calculate the second transmit power control parameter based on the first transmit power control parameter and the differential transmit power control parameter; and perform power control operations based on the first transmit power control parameter and the second transmit power control parameter.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a flow diagram illustrating example operations for wireless communication by a BS, in accordance with certain aspects of the present disclosure.

FIG. 6 is a flow diagram illustrating example operations for wireless communication by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
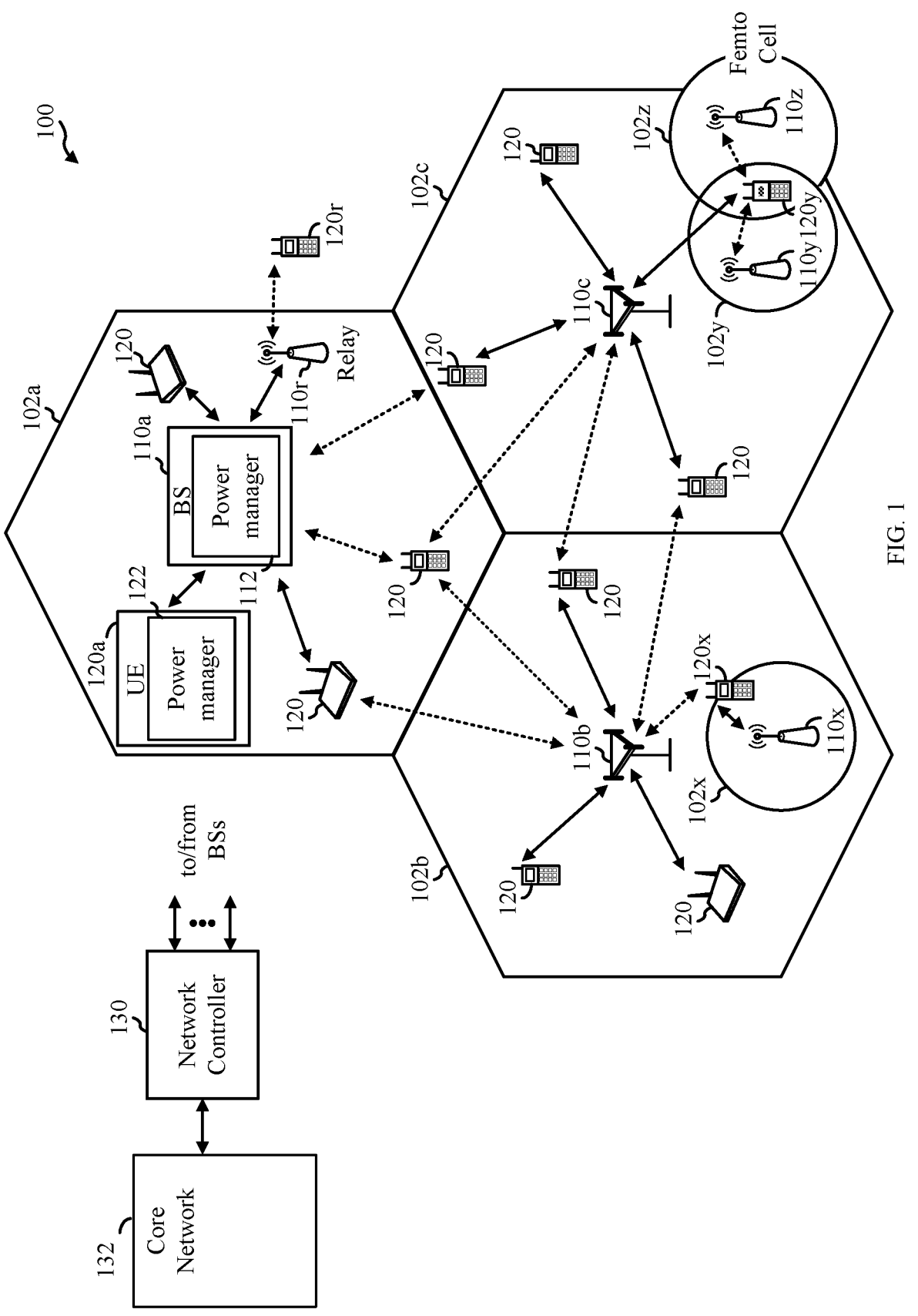
FIG. 1 is a block diagram conceptually illustrating an example telecommunications system, in accordance with certain aspects of the present disclosure.

Aspects of the present disclosure provide apparatus, methods, processing systems, and computer readable mediums for power control. For example, in certain aspects, a power control parameter may be reported to a base station for a first panel of a user-equipment (UE), and a second power control parameter may be reported to the base station for a second panel of the UE. The second power control parameter may be reported using a differential power control parameter indicating a difference between the first power control parameter and the second power control parameter. As used herein, a panel generally refers to an antenna panel that may include multiple antenna elements.

The following description provides examples of power control in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE.

Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for power control. As shown in FIG. 1, the BS 110*a* includes a power manager 112. The power manager 112 may be configured for receiving a reporting message comprising a first transmit power control parameter and a differential transmit power control parameter, wherein the first transmit power control parameter is associated with a first panel of the UE and the differential transmit power control parameter indicates a second transmit power control parameter associated with a second panel of the UE, the differential transmit power control parameter indicating a difference between the first transmit power control parameter and the second transmit power control parameter; calculating the second transmit power control parameter based on the first transmit power control parameter and the differential transmit power control parameter; and performing power control operations based on the first transmit power control parameter and the second transmit power control parameter, in accordance with aspects of the present disclosure.

As shown in FIG. 1, the UE 120a includes a power manager 122. The power manager 122 may be configured for determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter generating a reporting message indicating the first transmit power control parameter and the differential transmit power control parameter; and transmitting the reporting message to a base station, in accordance with aspects of the present disclosure.

Figure 2:
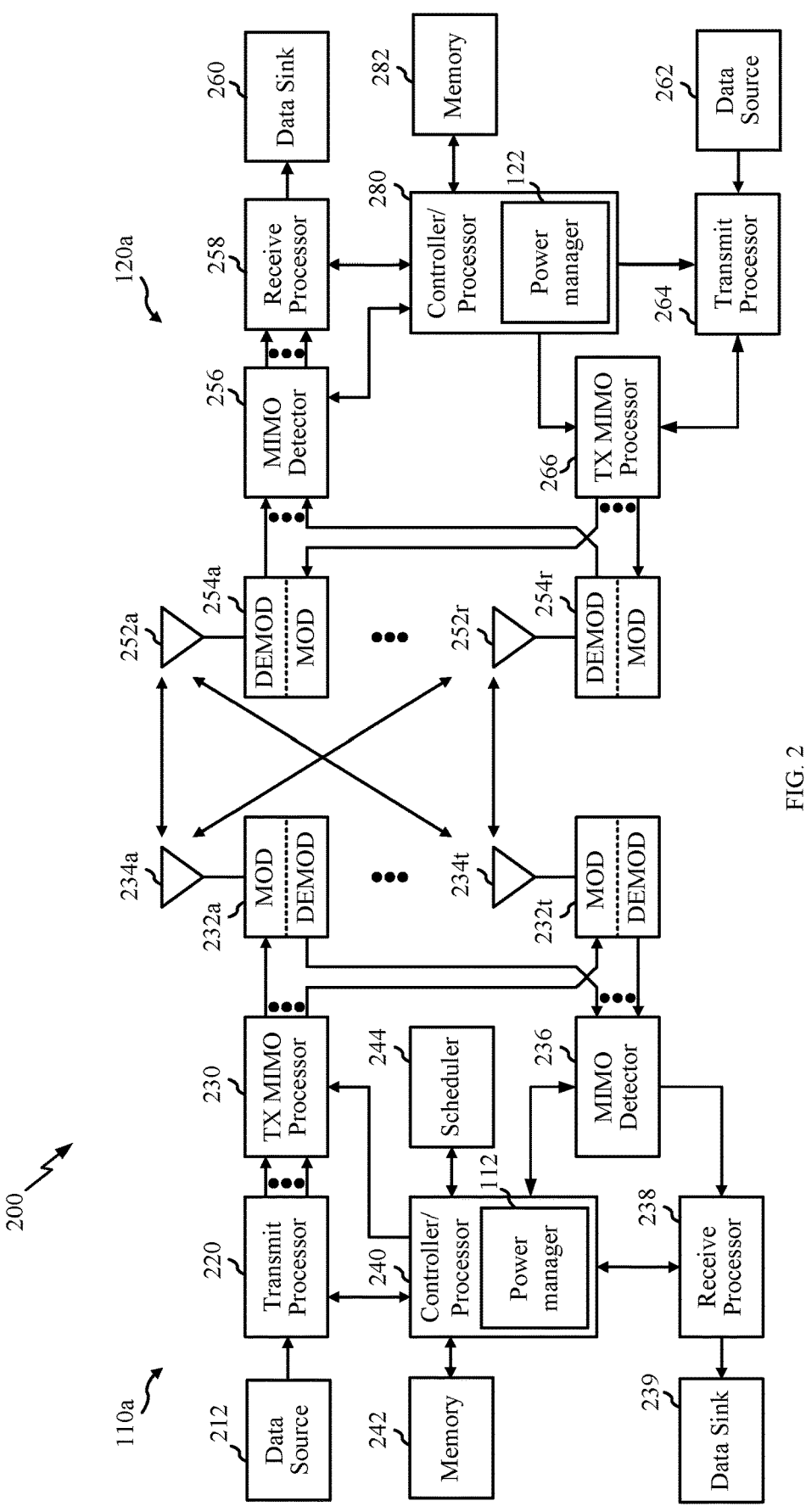
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the power manager 112, according to aspects described herein. As shown in FIG. 2, the controller/processor 280 of the UE 120a has a power manager 122, according to aspects described herein. Although shown at the controller/processor, other components of the UE 120a and BS 110a may be used to perform the operations described herein. In some cases, the antennas 234 or antennas 252 may be configured as multiple antenna panels to implement a multi-panel MIMO communication system. In some aspects, power control parameters may be reported for each panel of the UE.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
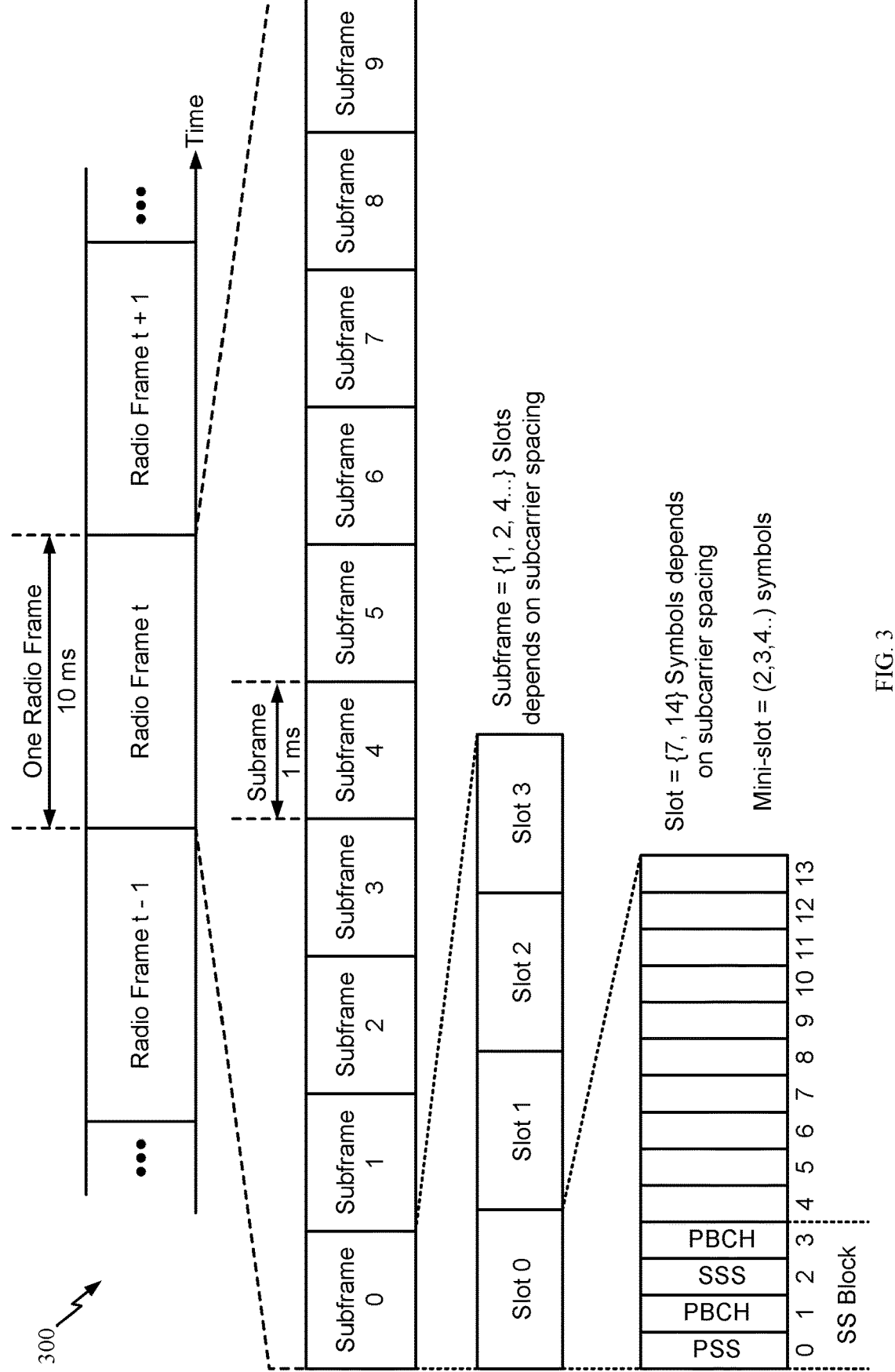
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Power Control Techniques

Certain aspects of the present disclosure are generally directed to power control operations for multi-panel wireless communications. For example, different panels of a wireless node may be used to implement multi-panel wireless communication. In some aspects, a user-equipment (UE) may indicate, to a base station, a power headroom (PH) and configured maximum transmit power ($P_{CMAX}$) associated with each panel of the UE, allowing the BS to perform power control operations.

Figure 4A:
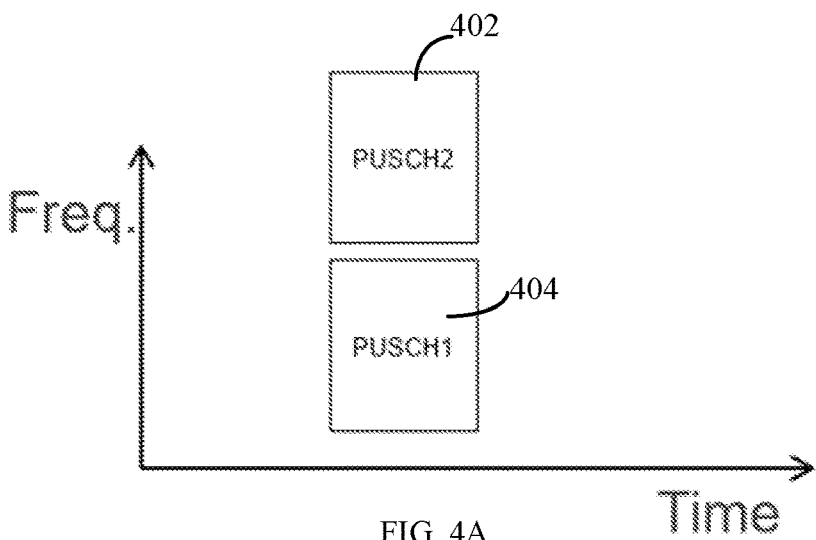
FIGS. 4A, 4B, and 4C illustrate frequency divisional, time division, and spatial division multiplexing, respectively.
Figure 4B:
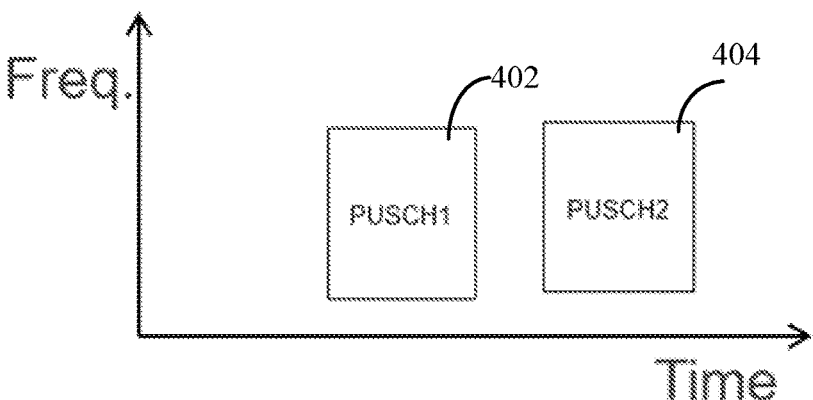
Figure 4C:
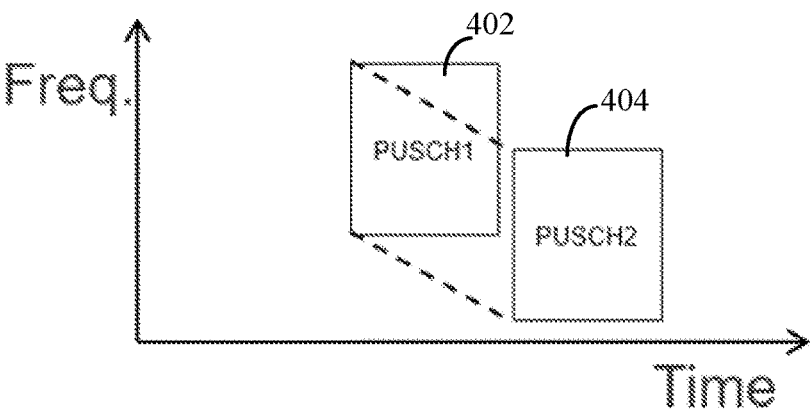

FIGS. 4A, 4B, and 4C illustrate frequency divisional, time division, and spatial division multiplexing, respectively. As illustrated in FIG. 4A, physical uplink shared channels (PUSCHs) 402, 404 may be transmitted using time divisional duplex (TDD). For instance, PUSCHs 402, 404 may be transmitted using different time resources. As illustrated in FIG. 4B, PUSCHs 402, 404 may be transmitted using frequency division duplex (FDD). In other words, PUSCHs 402, 404 may be transmitted using different frequency resources. As illustrated in FIG. 4C, spatial divisional multiplexing (SDM) may be implemented for transmission of PUSCHs 402, 404 using different spatial regions. Separate panels of the UE may be scheduled for transmission by a single downlink control information (DCI) transmission or separate DCI transmissions. As described herein, a UE may indicate, to a base station, a power headroom (PH) and configured maximum transmit power ($P_{CMAX}$) associated with each panel of the UE, allowing the BS to perform power control operations.

A first panel of the UE may be associated with a first transmission precoding matrix indication (TPMI1), first sounding reference signal (SRS) resource indicator (SRI1). A second panel of the UE may be associated with a first UL transmission configuration indicator (TCI1), and a second panel of the UE may be associated with a second TPMI (TPMI2), second SRI (SRI2), and a second UL TCI (TCI2).

Power control for PUSCH may be performed using real or virtual transmission techniques. For example, a UE may transmit a PUSCH on active uplink (UL) bandwidth part (BWP) b of carrier f of serving cell c using parameter set configuration with index j and PUSCH power control adjustment state with index 1. For the real transmission technique, the transmit power for PUSCH P ($P_{PUSCH}$) may be determined using the following equation:

$$P_{PUSCH}(i, j, q_d, l) = P_{oPUSCH,b,f,c}(j) + 10 \log_{10}(2^\mu M_{RB,b,f,c}^{PUSCH}(i)) + \alpha_{b,f,c}(j)PL_{b,f,c}(q_d) + \Delta_{TF,b,f,c}(i) + f_{b,f,c}(i,l)$$

where $P_{oPUSCH,b,f,c}$ is a target signal-to-interference-plus-noise ratio (SINR) set by an initial power (P0) value, $M_{RB,b,f,c}^{PUSCH}(i)$ is the bandwidth of the PUSCH resource assignment expressed in number of resource blocks for PUSCH transmission, $\alpha_{b,f,c}$ is path loss compensation factor. $PL_{b,f,c}$ is the path loss associated with a reference signal (RS), $\Delta_{TF,f,c}$ is a modulation and coding scheme (MCS) related adjustment, and $f_{b,f,c}$ is the PUSCH power control adjustment state.

For virtual transmission, the transmit power for PUSCH may determine using the following equation:

$$P_{PUSCH}(i,j,q_d,l) = P_{oPUSCH,b,f,c}(j) + \alpha_{b,f,c}(j)PL_{b,f,c}(q_d) + f_{b,f,c}(i,l)$$

where default parameters are used for i, j, $q_d$, 1.

While techniques for transmission of PUSCH have been described to facilitate understanding, the aspects described herein may be applied for transmission of various suitable signals, such as PUSCH, physical uplink control channel (PUCCH), and SRS. For example, the UE may report PH for PUSCH, PUCCH, and SRS. Per panel power headroom calculation at the UE (e.g., panel ID k=0, 1) may include a type1-per panel PH for PUSCH per equation:

$$PH_{type1,b,f,c}(i, j, q_d, l, k) = P_{CMAX,f,c}(i, k) - P_{k,PUSCH}(i, j, q_d, l)$$

type2-per panel PH for PUCCH may be calculated per equation:

$$PH_{type2,b,f,c}(i, q_u, q_d, l, k) = P_{CMAX,f,c}(i, k) - P_{k,PUCCH}(i, q_u, q_d, l)$$

and type3-per panel PH for SRS may be calculated per equation:

$$PH_{type3,b,f,c}(i, q_s, q_d, l,k) = P_{CMAX,f,c}(i, k) - P_{k,SRS}(i, q_s, q_d, l)$$

where $P_{CMAX,f,c}(i, k)$ is the configured maximum transmit power applicable to panel k. In some cases, the configured maximum transmit power may be the same for all the panels. Moreover, the PH may be calculated using the real or virtual techniques described herein.

The panel ID k=0, 1 may be implicitly associated with various parameters. These parameters may include CORE-SETpoolindex, where a CORESET may be configured with a CORESETpoolindex and values of 0 and 1 are associated with different UE panels. The parameters may also include SRS resource set ID/SRS resource ID, where one SRS set ID or SRS resource ID is associated with a UE panel, and another SRS set ID or SRS resource ID is associated with another UE panel.

The parameters may include beam ID/beam group ID, wherein a beam ID or beam group ID is associated with a UE panel, and another beam ID or beam group ID is associated with another UE panel. A beam may be a transmission configuration indicator (TCI) or spatial relation information. The parameters may also include a close loop index (e.g., an uplink transmit power control configuration may be configured with a close loop index) with value of 0 and 1 associated with different UE panels.

The parameters may also include antenna port ID/antenna port group ID. The antenna port may be a PUSCH, SRS, or phase tracking reference signal (PTRS) antenna port. An antenna port ID or antenna port group ID may be associated with a UE panel, and another antenna port ID or antenna port group ID may be associated with another UE panel.

The parameters may include demodulation reference signal (DMRS) code-divisional multiplexing (CDM) group ID, where a DMRS CDM group ID is associated with a UE panel, and another DMRS CDM group ID is associated with another UE panel. The parameters may also include a timing advance group (TAG) ID (e.g., which may be configured for panel specific Timing Advance). A TAG ID may be associated with a UE panel, and another TAG ID may be associated with another UE panel.

The parameters may also include PUCCH resource ID/resource group ID, where a PUCCH resource ID or resource group ID is associated with a UE panel, and another PUCCH resource ID or resource group ID is associated with another UE panel. The parameters may also include multiple Radio Network Temporary Identifiers (RNTIs), where a RNTI is associated with a UE panel, and another RNTI is associated with another UE panel. The parameters may also include physical cell ID (PCI) or synchronization signal block (SSB) set ID, where a PCI or SSB set ID is associated with a UE panel, and another PCI or SSB set ID is associated with another UE panel.

Certain aspects of the present disclosure provide techniques for reporting of PH, Pcmax, or both, using a differential reporting technique. For example, certain aspects provide support for reporting a differential PH value in a multi-panel PH report (PHR). A first PH value may be reported using an absolute PH value (PH1), and a second PH value (PH2) is reported by a differential value (dPH2) to the first PH value. For example, PH1 may be calculated using the following equation:

$$PH1 = PH(\text{type } X, \text{panel } 0)$$

and dPH2 may be calculated using the following equation:

$$dPH2 = PH(\text{type } X, \text{panel } 1) - PH(\text{type } X, \text{panel } 0)$$

where PH(type X, panel 1) is the PH for panel 1 having a type X (e.g., type 1, as described herein), and PH(type X, panel 0) is the PH for panel 0 having the type X.

As another example, certain aspects provide support for reporting a differential Pcmax value in a reporting message. For instance, a first Pcmax (Pcmax1) value may be reported using an absolute Pcmax value, and a second Pcmax value may be reported by a differential value (dPcmax2) to the first Pcmax value. Thus, Pcmax1 may be calculated using equation:

$$Pcmax1 = P_{CMAX,f,c}(0)$$

and dPcmax2 may be calculated using equation:

$$dPcmax2 = P_{CMAX,f,c}(1) - P_{CMAX,f,c}(0)$$

where $P_{CMAX,f,c}(1)$ is the configured maximum transmit power for panel 1, and $P_{CMAX,f,c}(0)$ is the maximum transmit power for panel 0.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100).

Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, with the BS receiving a reporting message (e.g., medium access control (MAC) control element (MAC-CE)) comprising a first transmit power control parameter (e.g., PHR parameter or Pcmax parameter) and a differential transmit power control parameter. The first transmit power control parameter may be associated with a first panel of the UE and the differential transmit power control parameter indicates a second transmit power control parameter associated with a second panel of the UE, the differential transmit power control parameter indicating a difference between the first transmit power control parameter and the second transmit power control parameter. At block 510, the BS may calculate the second transmit power control parameter based on the first transmit power control parameter and the differential transmit power control parameter, and at block 515, perform power control operations based on the first transmit power control parameter and the second transmit power control parameter.

FIG. 6 is a flow diagram illustrating example operations 600 for wireless communication, in accordance with certain aspects of the present disclosure. The operations 600 may be performed, for example, by UE (e.g., such as a UE 120a in the wireless communication network 100).

The operations 600 may be complimentary operations by the UE to the operations 500 performed by the BS. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, with the UE determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter. At block 610, the UE generates a reporting message indicating the first transmit power control parameter and the differential transmit power control parameter, and at block 615, transmits the reporting message to a base station.

Figure 7:
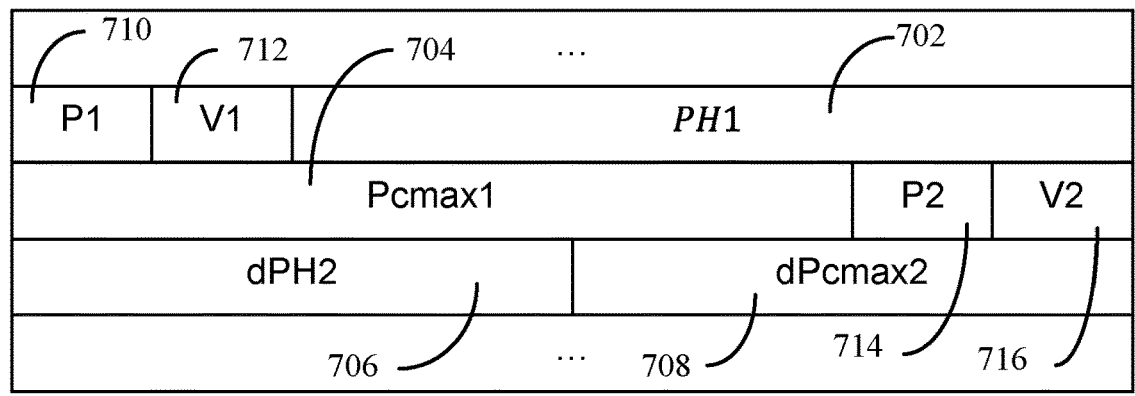
FIG. 7 illustrates a reporting message 700 for reporting a differential power headroom (PHR) parameter and a differential maximum power (Pcmax) parameter, in accordance with certain aspects of the present disclosure.

FIG. 7 illustrates a reporting message 700 (e.g., MAC-CE) for reporting a differential PH parameter and a differential Pcmax parameter, in accordance with certain aspects of the present disclosure. As illustrated, the reporting message 700 includes a PH1 field 702 for indicating a PH parameter for a first panel of the UE, and a dPH2 field 706 for indicating a differential PH parameter for a second panel of the UE. The PH value in PH1 field 702 may be reported as 6 bits, and the dPH value in the dPH2 field 706 may be reported by 4 bits.

The reporting message 700 may also include a Pcmax1 field 704 for indicating a Pcmax parameter for the first panel of the UE, and a dPcmax2 field 708 for indicating a differential Pcmax parameter for the second panel of the UE. The Pcmax value in the Pcmax1 field 704 may be reported as 6 bits, and the dPcmax value of the dPcmax2 field 708 may be reported by 4 bits.

The reporting message 700 may also include Pk fields, k being an integer associated with a panel of the UE. For example, the reporting message 700 may include a P1 field 710 for a first panel of the UE and P2 field 714 for a second panel of the UE. The Pk fields indicate whether the MAC entity applies power backoff to the kth panel (e.g., panel 1 and panel 2) due to power management when reporting a respective value of Pcmax.

The reporting message 700 may also include Vk fields, k being the integer associated with the panel of the UE. For example, the reporting message 700 may include a V1 field 712 for a first panel of the UE and V2 field 716 for a second panel of the UE. Vk is a field that indicates if the PH value is based on a real transmission or a virtual reference format to kth panel. Furthermore, for Type 1, Type 2, and Type 3 PH, the V field may be set to 0 to indicate the presence of the field containing the associated $P_{CMAX,f,c}$ field, and the V field may be set to 1 to indicate that the field containing the associated $P_{CMAX,f,c}$ field is omitted. FIG. 7 shows one example of the reporting message 700 having three octets in MAC-CE.

Figure 8:
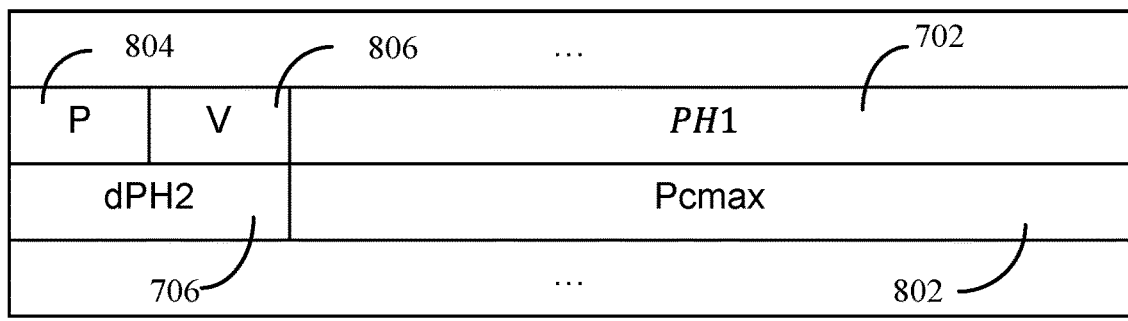
FIG. 8 illustrates a reporting message for reporting a differential PHR parameter and a Pcmax parameter, in accordance with certain aspects of the present disclosure.

FIG. 8 illustrates a reporting message 800 for reporting a differential PH parameter and a Pcmax parameter, in accordance with certain aspects of the present disclosure. For example, the reporting message 800 may include PH1 field 702, and dPH2 field 706. The PH value in PH1 field 702 may be reported as 6 bits, and the dPH value in the dPH2 field 706 may be reported by 2 bits. In SDM, two UL transmissions are spatially multiplexed, may be used for simultaneous transmission, and may be scheduled by a single transmission configuration indicator (TCI). Thus, the power difference between two transmissions of different panels may not be large because a large power difference may cause interference issues. Therefore, only 2 bits may be used for dPH2 field 706, in some implementations. FIG. 8 shows one example of the reporting message 800 having two octets in MAC-CE.

The reporting message may also include Pcmax field 802 for indicating a Pcmax parameter. The Pcmax parameter may be cell-specific and panel-common, and may be reported by 6 bits. The reporting message 800 also includes a P field 804 that indicates whether the MAC entity applies power backoff to the cell-specific and panel common value of Pcmax due to power management. The reporting message 800 may also include a V field 806 that indicates if the PH value is based on a real transmission or a virtual reference format to the cell. Furthermore, for Type 1, Type 2, and Type 3 PH, the V field may be set to 0 to indicate the presence of the field containing the associated $P_{CMAX,f,c}$ field, and the V field may be set to 1 to indicate that the field containing the associated $P_{CMAX,f,c}$ field is omitted.

Figure 9:
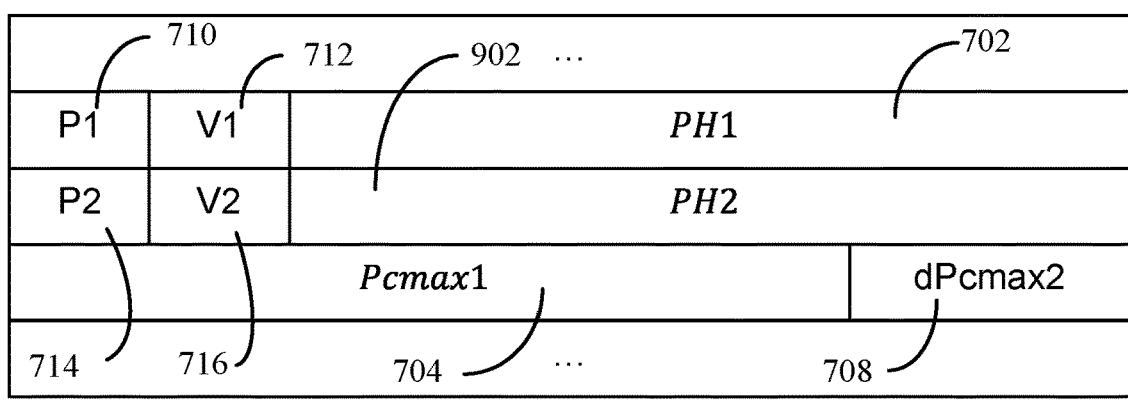
FIG. 9 illustrates a reporting message for reporting a PHR parameter and a differential Pcmax parameter, in accordance with certain aspects of the present disclosure.

FIG. 9 illustrates a reporting message 900 for reporting a PH parameter and a differential Pcmax parameter, in accordance with certain aspects of the present disclosure. For example, the reporting message 900 may include a PH1 field 702 indicating a PH parameter for a first panel of the UE, and a PH2 field 902 indicating a PH parameter for a second panel of the UE. The PH value in PH1 field 702 may be reported as 6 bits, and the PH value in the PH2 field 902 may be reported by 6 bits.

The reporting message 900 may also include a Pcmax1 field 704 for indicating a Pcmax parameter for the first panel of the UE, and a dPcmax2 field 708 for indicating a differential Pcmax parameter for the second panel of the UE. The Pcmax value in the Pcmax1 field 704 may be reported as 6 bits, and the dPcmax value of the dPcmax2 field 708 may be reported by 2 bits. The Pcmax associated with a panel may correspond to the power class of the panel. Multiple panels of the UE may be associated with the same or similar power class, and thus, the Pcmax values of the panels may be relatively close. Therefore, only 2 bits may be used for the dPcmax value in some implementations. Moreover, a UE may control a power backoff value of a panel to allow the dPcmax to be reported using 2 bits.

Figure 10:
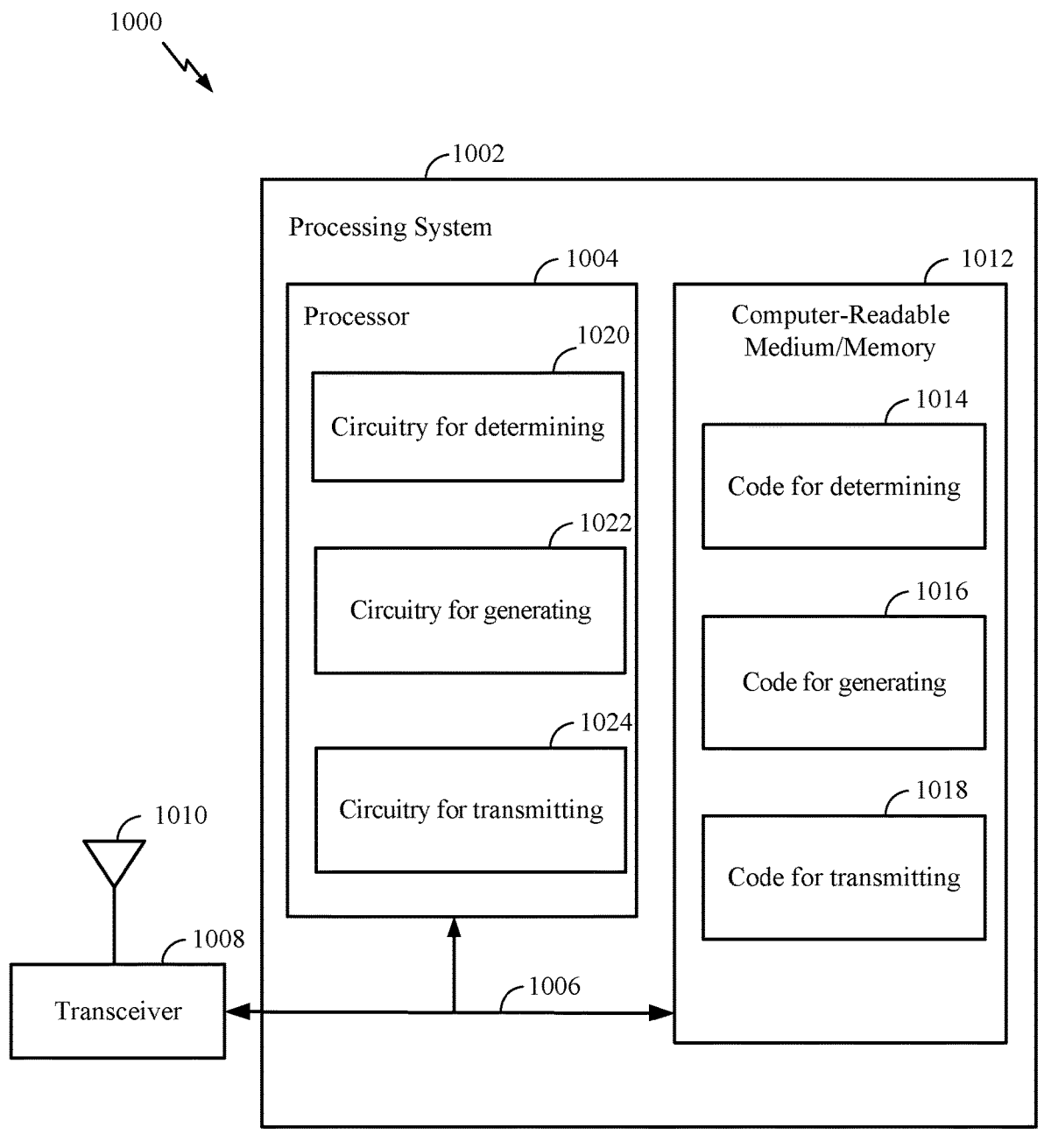
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 6. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. In some cases, antenna 1010 may include multiple antenna panels for implementing a multi-panel communication system. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6, or other operations for performing the various techniques discussed herein for power control. In certain aspects, computer-readable medium/memory 1012 stores code 1014 for determining a first transmit power control parameter associated with a first panel of the UE (e.g., a first antenna panel associated with antenna 1010) and a differential transmit power control parameter to be used to indicate a second transmit power control parameter associated with a second panel (e.g., a second antenna panel associated with antenna 1010) of the UE, the differential transmit power control parameter indicating a difference between the first transmit power control parameter and the second transmit power control parameter; code 1016 for generating a reporting message indicating the first transmit power control parameter and the differential transmit power control parameter; and code 1018 for transmitting the reporting message to a base station. In certain aspects, the processor 1004 has circuitry configured to implement the code stored in the computer-readable medium/memory 1012. The processor 1004 includes circuitry 1020 for determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter; circuitry 1022 for generating a reporting message indicating the first transmit power control parameter and the differential transmit power control parameter; and circuitry 1024 for transmitting the reporting message to a base station.

Figure 11:
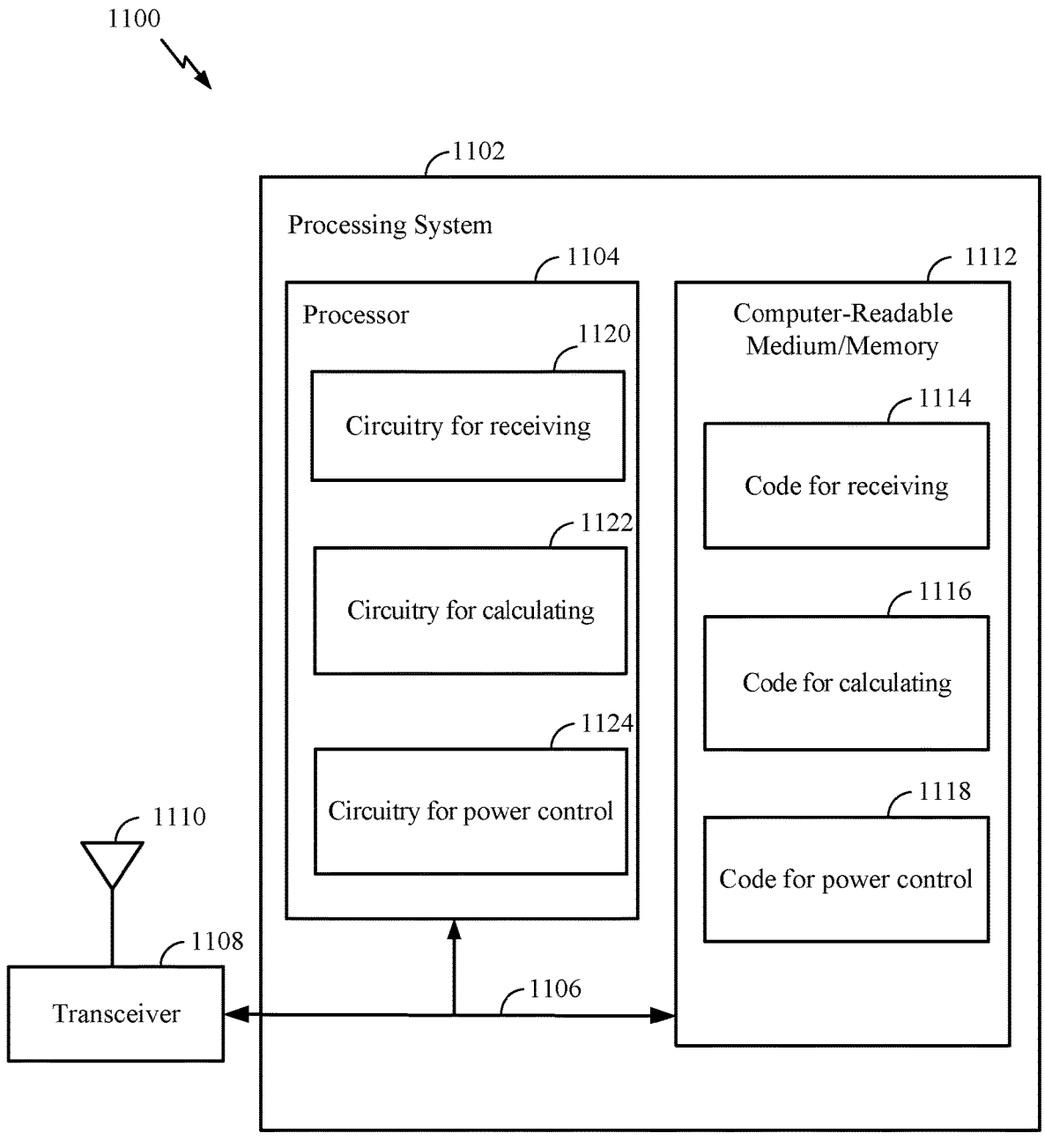
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 5. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. In some cases, antenna 1110 may include multiple antenna panels for implementing a multi-panel communication system. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions (e.g., computer-executable code) that when executed by the processor 1104, cause the processor 1104 to perform the operations illustrated in FIG. 5, or other operations for performing the various techniques discussed herein for power control. In certain aspects, computer-readable medium/memory 1112 stores code 1114 for receiving a reporting message comprising a first transmit power control parameter and a differential transmit power control parameter, wherein the first transmit power control parameter is associated with a first panel of the UE and the differential transmit power control parameter indicates a second transmit power control parameter associated with a second panel of the UE, the differential transmit power control parameter indicating a difference between the first transmit power control parameter and the second transmit power control parameter; code 1116 for calculating the second transmit power control parameter based on the first transmit power control parameter and the differential transmit power control parameter; and code 1118 for performing power control operations based on the first transmit power control parameter and the second transmit power control parameter. In certain aspects, the processor 1104 has circuitry configured to implement the code stored in the computer-readable medium/memory 1112. The processor 1104 includes circuitry 1120 for receiving a reporting message comprising a first transmit power control parameter and a differential transmit power control parameter, wherein the first transmit power control parameter is associated with a first panel of the UE and the differential transmit power control parameter indicates a second transmit power control parameter associated with a second panel of the UE, the differential transmit power control parameter indicating a difference between the first transmit power control parameter and the second transmit power control parameter; circuitry 1122 for calculating the second transmit power control parameter based on the first transmit power control parameter and the differential transmit power control parameter; and circuitry 1124 for performing power control operations based on the first transmit power control parameter and the second transmit power control parameter.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. A method for wireless communication by a user-equipment (UE), comprising:
determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter;
generating a reporting message indicating the first transmit power control parameter and the differential transmit power control parameter; and
transmitting the reporting message to a base station.

2. The method of claim 1, wherein the first transmit power control parameter is indicated via the reporting message using a fewer number of bits than the differential transmit power control parameter.

3. The method of claim 1, wherein:
the first transmit power control parameter comprises a first power headroom (PH) parameter; and
the second transmit power control parameter comprises a second PH parameter, the differential transmit power control parameter being a differential PH parameter indicating a difference between the first PH parameter and the second PH parameter.

4. The method of claim 3, wherein the first PH parameter is indicated via the reporting message using 6 bits, and wherein the second PH parameter is indicated via the reporting message using 4 bits.

5. The method of claim 3, wherein the first PH parameter is indicated via the reporting message using 6 bits, and wherein the second PH parameter is indicated via the reporting message using 2 bits.

6. The method of claim 3, further comprising determining a maximum transmit power (Pcmax) parameter, wherein the Pcmax parameter is common to the first panel and the second panel of the UE, and wherein the reporting message comprises the Pcmax parameter.

7. The method of claim 6, wherein the Pcmax parameter is specific to a serving cell of the UE.

8. The method of claim 6, wherein the Pcmax parameter is indicated via the reporting message using 6 bits.

9. The method of claim 3, wherein the first PH parameter is indicated via the reporting message using 6 bits, and wherein the second PH parameter is indicated via the reporting message using 6 bits.

10. The method of claim 3, further comprising determining a first Pcmax parameter associated with the first panel of the UE and a differential Pcmax parameter to be used to indicate a second Pcmax parameter associated with the second panel of the UE, the differential Pcmax parameter indicating a difference between the first Pcmax parameter and the second Pcmax parameter, and wherein the reporting message further comprises the first Pcmax parameter and the differential Pcmax parameter.

11. The method of claim 10, wherein the first Pcmax parameter is indicated via the reporting message using 6 bits, and wherein the differential Pcmax parameter is indicated via the reporting message using 2 bits.

12. The method of claim 1, wherein:

the first transmit power control parameter comprises a first Pcmax parameter; and the second transmit power control parameter comprises a second Pcmax parameter.

13. The method of claim 12, wherein the first Pcmax parameter is indicated via the reporting message using 6 bits, and wherein the second Pcmax parameter is indicated via the reporting message using 4 bits.

14. The method of claim 1, wherein the reporting message comprises a medium access control (MAC) control element (MAC-CE).

15. The method of claim 1, wherein the first transmit power control parameter and the second transmit power control parameter are used to configure a transmit power for transmission of a physical uplink shared channel (PUSCH), physical uplink control channel (PUCCH), or sounding reference signal (SRS).

16. A method for wireless communication by a base station, comprising:

receiving a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter;

calculating the second transmit power control parameter based on the first transmit power control parameter and the differential transmit power control parameter; and performing power control operations based on the first transmit power control parameter and the second transmit power control parameter.

17. The method of claim 16, wherein the first transmit power control parameter is indicated via the reporting message using a fewer number of bits than the differential transmit power control parameter.

18. The method of claim 16, wherein:

the first transmit power control parameter comprises a first power headroom (PH) parameter; and the second transmit power control parameter comprises a second PH parameter, the differential transmit power control parameter being a differential PH parameter indicating a difference between the first PH parameter and the second PH parameter.

19. The method of claim 18, wherein the first PH parameter is indicated via the reporting message using 6 bits, and wherein the second PH parameter is indicated via the reporting message using 4 bits.

20. The method of claim 18, wherein the first PH parameter is indicated via the reporting message using 6 bits, and wherein the second PH parameter is indicated via the reporting message using 2 bits.

21. The method of claim 18, wherein the reporting message further comprises a maximum transmit power (Pcmax) parameter, wherein the Pcmax parameter is common to the first panel and the second panel of the UE, and wherein the power control operations are performed further based on the Pcmax parameter.

22. The method of claim 21, wherein the Pcmax parameter is specific to a serving cell of the UE.

23. The method of claim 21, wherein the Pcmax parameter is indicated via the reporting message using 6 bits.

24. The method of claim 18, wherein the first PH parameter is indicated via the reporting message using 6 bits, and wherein the second PH parameter is indicated via the reporting message using 6 bits.

25. The method of claim 18, wherein the reporting message further comprises a first Pcmax parameter associated with the first panel of the UE and a differential Pcmax parameter indicating a second Pcmax parameter associated with the second panel of the UE, the differential Pcmax parameter indicating a difference between the first Pcmax parameter and the second Pcmax parameter, and wherein the power control operations are performed further based on the first Pcmax parameter and the differential Pcmax parameter.

26. The method of claim 25, wherein the first Pcmax parameter is indicated via the reporting message using 6 bits, and wherein the differential Pcmax parameter is indicated via the reporting message using 2 bits.

27. The method of claim 16, wherein:

the first transmit power control parameter comprises a first Pcmax parameter; and the second transmit power control parameter comprises a second Pcmax parameter.

28. The method of claim 27, wherein the first Pcmax parameter is indicated via the reporting message using 6 bits, and wherein the second Pcmax parameter is indicated via the reporting message using 4 bits.

29. The method of claim 16, wherein the reporting message comprises a medium access control (MAC) control element (MAC-CE).

30. The method of claim 16, wherein the first transmit power control parameter and the second transmit power control parameter are used to configure a transmit power for transmission of a physical uplink shared channel (PUSCH), physical uplink control channel (PUCCH), or sounding reference signal (SRS).

31. An apparatus for wireless communication by a user-equipment (UE), comprising:

a processing system configured to:

determine a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter; and generate a reporting message indicating the first transmit power control parameter and the differential transmit power control parameter; and a transmitter configured to transmit the reporting message to a base station.

32. An apparatus for wireless communication by a base station, comprising:

a receiver configured to receive a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter; and a processing system configured to:

calculate the second transmit power control parameter based on the first transmit power control parameter and the differential transmit power control parameter; and perform power control operations based on the first transmit power control parameter and the second transmit power control parameter.

33. An apparatus for wireless communication by a user-equipment (UE), comprising:

means for determining a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter;

means for generating a reporting message indicating the first transmit power control parameter and the differential transmit power control parameter; and means for transmitting the reporting message to a base station.

34. An apparatus for wireless communication by a base station, comprising:

means for receiving a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter;

means for calculating the second transmit power control parameter based on the first transmit power control parameter and the differential transmit power control parameter; and means for performing power control operations based on the first transmit power control parameter and the second transmit power control parameter.

35. A non-transitory computer-readable medium having instructions stored thereon to cause a user-equipment (UE) to:

determine a first transmit power control parameter associated with a first panel of the UE and a differential transmit power control parameter to be used to indicate a second transmit power control parameter associated with a second panel of the UE, the differential transmit power control parameter indicating a difference between the first transmit power control parameter and the second transmit power control parameter;

generate a reporting message indicating the first transmit power control parameter and the differential transmit power control parameter; and transmit the reporting message to a base station.

36. A non-transitory computer-readable medium having instructions stored thereon to cause a base station to:

receive a reporting message comprising a first transmit power control parameter and a differential transmit power control parameter, wherein the first transmit power control parameter is associated with a first panel of a user-equipment (UE) and the differential transmit power control parameter indicates a second transmit power control parameter associated with a second panel of the UE, the differential transmit power control parameter indicating a difference between the first transmit power control parameter and the second transmit power control parameter;

calculate the second transmit power control parameter based on the first transmit power control parameter and the differential transmit power control parameter; and perform power control operations based on the first transmit power control parameter and the second transmit power control parameter.

\*   \*   \*   \*   \*